United States Patent
Agnihotri et al.

(10) Patent No.: US 9,452,829 B2
(45) Date of Patent: Sep. 27, 2016

(54) YAW CONTROL OF CO-AXIAL ROTOR

(71) Applicant: Sikorsky Aircraft Corporation, Stratford, CT (US)

(72) Inventors: Ashok Agnihotri, Southlake, TX (US); Steven D. Weiner, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 519 days.

(21) Appl. No.: 14/049,091

(22) Filed: Oct. 8, 2013

(65) Prior Publication Data

US 2015/0097075 A1 Apr. 9, 2015

(51) Int. Cl.
   *B64C 27/08* (2006.01)
   *B64C 27/10* (2006.01)
   *B64C 27/72* (2006.01)

(52) U.S. Cl.
   CPC ....... *B64C 27/10* (2013.01); *B64C 2027/7205* (2013.01); *Y02T 50/34* (2013.01)

(58) Field of Classification Search
   CPC ........................... B64C 39/024; B64C 27/025
   USPC ............................................ 244/17.23, 17.25
   See application file for complete search history.

(56) References Cited

U.S. PATENT DOCUMENTS

| | | | |
|---|---|---|---|
| 3,572,616 A | 3/1971 | Ulisnik | |
| 4,195,966 A | 4/1980 | Cornelius | |
| 4,720,059 A | 1/1988 | Stearns, Jr. | |
| 6,460,802 B1 * | 10/2002 | Norris | B64C 27/10 244/17.11 |
| 6,886,777 B2 * | 5/2005 | Rock | B64C 27/10 244/17.23 |
| 7,604,198 B2 | 10/2009 | Petersen | |
| 7,789,341 B2 * | 9/2010 | Arlton | B64C 27/10 244/17.23 |
| 8,128,034 B2 * | 3/2012 | Karem | B64C 27/08 244/17.23 |
| 8,146,854 B2 * | 4/2012 | Lawrence | B64C 39/024 244/17.23 |
| 8,565,941 B2 * | 10/2013 | Lading | B64C 27/52 244/17.23 |
| 8,661,781 B2 * | 3/2014 | Moore | B64C 11/48 244/17.23 |
| 2008/0203222 A1 | 8/2008 | Johnson | |

FOREIGN PATENT DOCUMENTS

| | | |
|---|---|---|
| EP | 0457710 A2 | 11/1991 |
| EP | 2476614 A2 | 7/2012 |
| FR | 2804403 A1 | 8/2001 |
| GB | 910678 A | 11/1962 |

OTHER PUBLICATIONS

European Search Report for application 14188109.4, dated Feb. 26, 2015, 9 pages.

* cited by examiner

*Primary Examiner* — Brian M O'Hara
*Assistant Examiner* — Keith L Dixon
(74) *Attorney, Agent, or Firm* — Cantor Colburn LLP

(57) ABSTRACT

A method for controlling rotor blades of a co-axial rotor assembly of an aircraft including a first rotor co-axial with a second rotor includes identifying a first zone of rotor rotation angles of the co-axial rotor assembly. The first zone defines a range of rotor rotation angles corresponding to an up-flow of air to the coaxial rotor assembly, and the remainder of the rotor rotation angles other than the first zone of rotation angles is defined as a second zone. The method includes receiving a yaw command to adjust a yaw moment of the aircraft and applying a different rotor blade angle change to rotor blades in the first zone than a rotor blade angle change applied to rotor blades in the second zone to adjust the yaw moment of the aircraft according to the yaw command.

20 Claims, 4 Drawing Sheets

YAW CONTROL OF CO-AXIAL ROTOR

BACKGROUND OF THE INVENTION

The subject matter disclosed herein relates to a set of coaxial counter-rotating rotor assemblies in which each individual blade is controlled separately and, in particular, to controlling rotor blades of the rotor assemblies to receive different rotor pitch angle control commands in different rotor azimuth angle.

Helicopters using coaxial counter-rotating rotors use differential collective between the rotors to provide yaw control at low and moderate speeds. The differential collective makes the blade collective angle of one rotor go up and the blade collective angle of the counter-rotating rotor blade go down. This provides increased torque for one rotor and decreased torque for the other rotor. Since the rotors rotate in opposite direction the net yawing moment felt by fuselage add up in the same direction.

Rotor blades of rotary-wing aircraft, such as helicopters, typically receive a down-flow of air coming to the rotor from above. In this conventional case the differential collective provides a yawing moment in an expected, and correct, direction. When the rotors receive an up-flow of air coming to the rotor from below, the torque, and therefore yawing moment, created by increasing blade collective may be in the opposite direction, and control of the aircraft is degraded. This is called autorotation state of the rotor. In this case the rotor is producing lift but requires no power applied to the rotor because up-flow through the rotor produces torque in the direction to propel the rotor and balances the torque required to rotate the rotor. At forward speeds the down-flow (in-flow) of the rotor is reduced and even changes to up-flow on the forward part of the rotor and the down-flow is increased on the aft part of the rotor.

Additionally, as the aircraft descends, the rotor receives air from beneath the rotor and up-flow increases. Therefore the yaw control provided by differential collective in co-axial counter rotating rotors degrades significantly at forward speeds and descending flights. Additional means of yaw control are provided in such designs. These include large rudders located at the back end of the helicopters. Because rudder effectiveness is proportional to the square of helicopter speed, large rudders are necessary to be useful at lower speeds. In addition, thrusters may be used. Both these designs increase cost, weight and complexity of the aircraft.

BRIEF DESCRIPTION OF THE INVENTION

According to one aspect of the invention, a method for controlling rotor blades of a co-axial rotor assembly of an aircraft including a first rotor co-axial with a second rotor includes identifying a first zone of rotor rotation angles of the co-axial rotor assembly. The first zone defines a range of rotor rotation angles corresponding to an up-flow of air to the coaxial rotor assembly, and the remainder of the rotor rotation angles other than the first zone of rotation angles is defined as a second zone. The method includes receiving a yaw command to adjust a yaw moment of the aircraft and applying a different rotor blade angle change to rotor blades in the first zone than a rotor blade angle change applied to rotor blades in the second zone to adjust the yaw moment of the aircraft according to the yaw command.

According to another aspect of the invention, a method for controlling rotor blades of a co-axial rotor assembly of an aircraft includes receiving a target yaw value to adjust a yaw moment of the aircraft and controlling a change in pitch angle of the rotor blades of the co-axial rotor assembly within a predetermined range of rotation angles defining a first zone to have a substantially constant value based on receiving the target yaw value. The method also includes controlling a change in pitch angle of the rotor blades of the co-axial rotor assembly in the remainder of rotation angles other than the predetermined range of rotation angles, defining a second zone, to be adjusted based on receiving the target yaw value.

Another aspect of the invention includes a co-axial rotor assembly of an aircraft. The rotor assembly includes a first rotor including a plurality of rotor blades configured to rotate around a shaft, a second rotor being co-axial with the first rotor and rotating in a direction opposite the first rotor and a rotor-blade controller. The rotor-blade controller is configured to identify a first zone of rotor rotation angles of the co-axial rotor assembly, the first zone defining a range of rotor rotation angles corresponding to predominantly an up-flow of air to the coaxial rotor assembly, and the remainder of the rotor rotation angles other than the first zone of rotation angles being defined as a second zone. The rotor-blade controller is configured to receive a yaw command to adjust a yaw moment of the aircraft, and the rotor-blade controller is configured to apply a different rotor blade angle change to rotor blades in the first zone than a rotor blade angle change applied to rotor blades in the second zone to adjust the yaw moment of the aircraft according to the yaw command.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Co-axial aircraft rotor systems, and in particular, counter-rotating systems, suffer from loss of control at certain speeds and travel directions, such as when descending at medium speeds. Embodiments of the invention relate to controlling rotor blades of a rotor system to improve yaw control of an aircraft.

Figure 1:
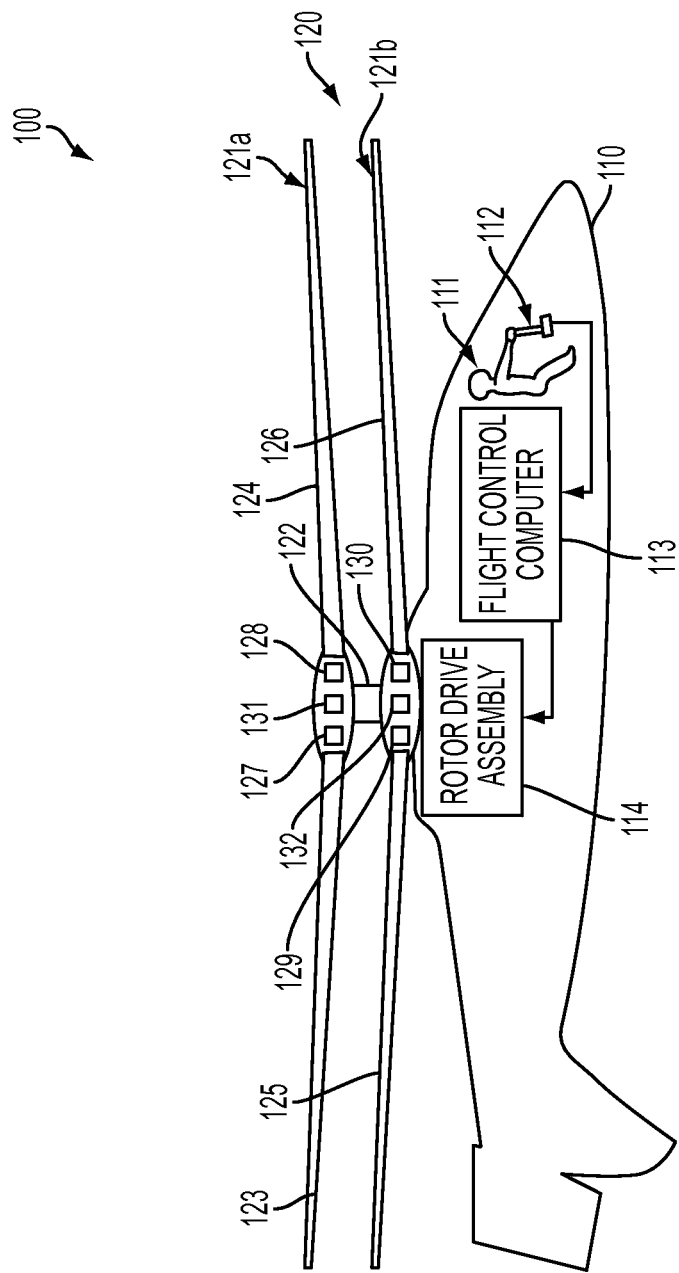
FIG. 1 illustrates a rotor-based system according to an embodiment of the invention.

FIG. 1 illustrates a co-axial rotor-based system 100 according to an embodiment of the invention. In embodiments of the invention, the system 100 includes an aircraft, such as a helicopter or other rotary-wing aircraft. The system 100 includes a fuselage 110 and a compound rotor assembly 120. The compound rotor assembly 120 rotates to lift and maintain the system 100 airborne. In the embodiment illustrated in FIG. 1, the compound rotor assembly 120 includes first and second rotor assemblies 121a and 121b that are co-axial and rotate in opposite direction with each other. The fuselage 110 houses a pilot 111, physical flight controls 112, a flight control computer 113 and a rotor drive assembly 114. In operation, the pilot 111 physically manipulates the physical flight controls 112, which may include a stick, lever, wheel, rudder pedals, side arm control arrangements or any other type of physical control, to generate command signals or values for longitudinal, lateral, yaw and collective movement of the system 100. The system 100 may be controlled by aircraft and rotor controls mechanically, with direct mechanical connections, or by a flight control computer 130, or by any combination of physical controls and computer controls. A flight control computer 130 may interpret positions of the physical flight controls 112 to generate the commands, or the physical flight controls 112 may include sensors or other mechanisms to translate physical positions and movements into electrical signals that are transmitted to the flight control computer 113.

The flight control computer 113 includes memory, one or more processors, logic and other circuitry to generate, process, and/or transmit the command signals or values. The command signals may include a lateral command, a longitudinal command, a yaw command and a collective command to control lateral movement of the system 100, longitudinal movement of the system 100, a rotation of the system 100 and total thrust of the system 100. It is understood that the longitudinal command corresponds to a forward and backward motion of the fuselage 110, and in particular to the lowering and raising of the nose and the tail; the lateral command corresponds to a side-to-side motion of the fuselage 110, and in particular rolling the aircraft left or right; yaw corresponds to rotation of the fuselage 110 nose to the right or left to change a direction of the nose of the fuselage 110; and the collective command corresponds to increasing or decreasing thrust of the fuselage 110 resulting the raising or lowering of the entire fuselage 110 simultaneously.

The flight control computer 113 may store flight control programs and other electronics that may take into account various environmental conditions and characteristics of the system 100 to generate the command signals. The command signals are transmitted to the rotor drive assembly 114. The rotor drive assembly 114 may include, for example, one or more motors or engines to drive one or more gears and shafts. The gears and shafts, in turn, drive the compound rotor assembly 120. In one embodiment, the rotor drive assembly 114 drives the first rotor assembly 121a in a first direction and the second rotor assembly 121b in an opposite direction.

The first rotor assembly 121a includes rotor blades 123 and 124, servos 127 and 128 to control the position of the rotor blades 123 and 124 and a servo-control computer 131 to calculate individual rotor control signals for each rotor blade 123 and 124 and to transmit the individual rotor control signals to the respective servos 127 and 128. In other words, the flight control computer 113 transmits to the servo-control computer 131 command signals based on the position of the controls 112.

Similarly, the second rotor assembly 121b includes rotor blades 125 and 126, servos 129 and 130 to control the position of the rotor blades 125 and 126 and a servo-control computer 132 to calculate individual rotor control signals for each rotor blade 125 and 126 and to transmit the individual rotor control signals to the respective servos 129 and 130. In other words, the flight control computer 113 transmits to the servo-control computer 132 command signals based on the position of the controls 112. The servo-control computer 132 receives the command signals from the flight control computer 113 and calculates the appropriate individual signals for each separate servo 129 and 130. The separate control signals generated for the separate servos 127, 128, 129 and 130 may be based on each of the lateral, longitudinal, yaw and collective command signals.

While separate computers 113, 131 and 132 have been illustrated in FIG. 1 to command signals and individual rotor blade control signals, embodiments of the invention are not limited to the configuration illustrated in FIG. 1. For example, in an alternative embodiment, the flight control computer 113 could generate the individual rotor blade control signals. In another alternative embodiment, the servo-control computers 131 and 132 may be the same computer. In yet another alternative embodiment, the servo-control computers 131 and 132 may be located in the fuselage 110. In other words, embodiments of the invention encompass any unitary or distributed computing system that receives pilot controls and outputs individual and different control signals to different rotor blades of a rotor assembly based on the same command signals generated from the pilot controls.

In addition, while FIG. 1 illustrates controls 112 that are physically manipulated by a pilot 111, embodiments of the invention are not limited to a human pilot 111 or a pilot 111 located in the fuselage 110. In alternative embodiments, the system 100 may be controlled by a computer executing a computer program, or the system 100 may be controlled remotely by a human or computer controller that is not located in the fuselage 110. In such an embodiment, a computer may replace the physical controls 112 to generate the latitude, longitude and collective commands.

In embodiments of the invention, each rotor blade 123, 124, 125 and 126 of the rotor assemblies 121a and 121b is controlled by a separate servo 127, 128, 129 and 130. In other words, the system 100 does not include a swashplate and does not use a swashplate to control the position of the rotor blades 123, 124, 125 or 126. Instead, each rotor blade 123, 124, 125 and 126 is controlled by a separate servo 127, 128, 129 and 120 that receives a separate rotor blade control signal.

Figure 2:
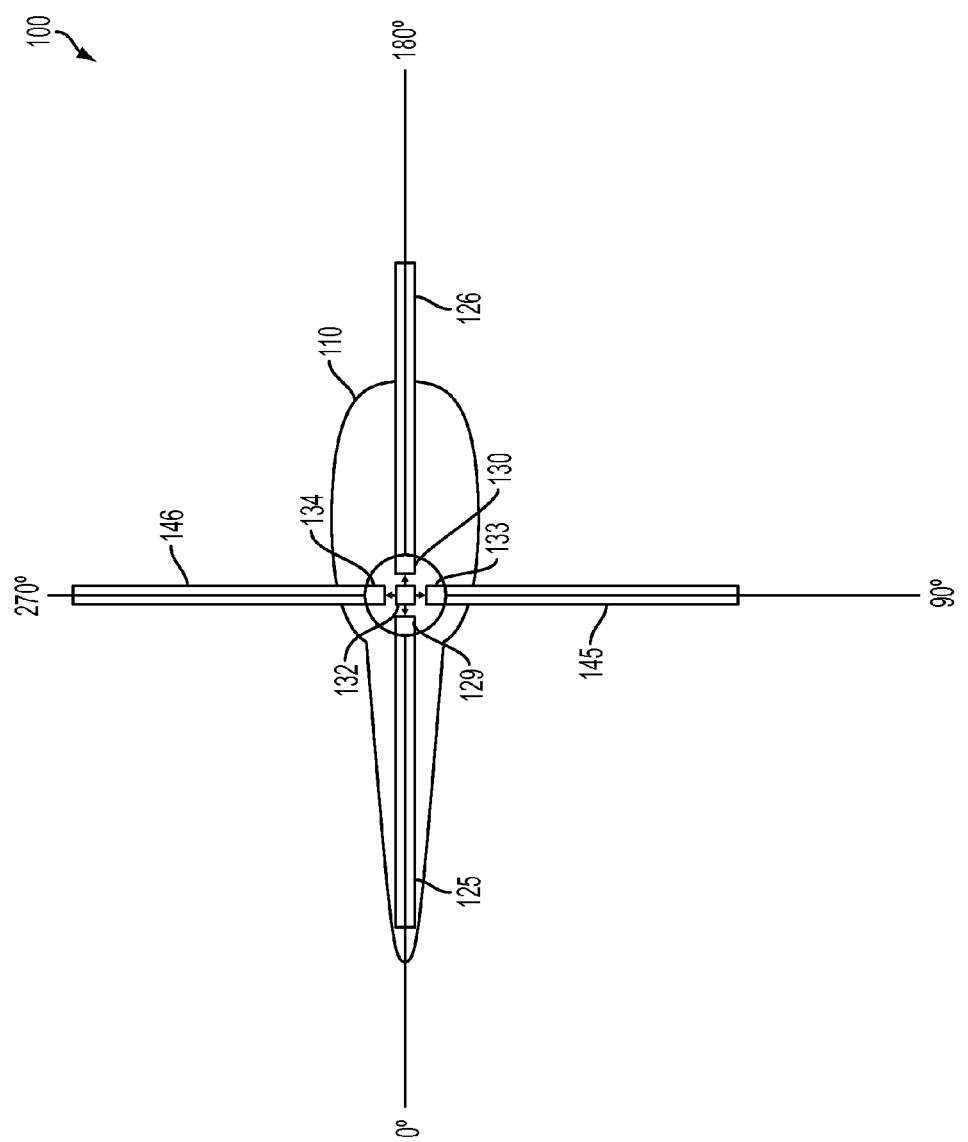
FIG. 2 illustrates azimuth positions of a rotor-based system according to an embodiment of the invention.

FIG. 2 illustrates a reference for determining the azimuthal position of the rotor assembly 121b of FIG. 1, including the rotor blades 125, 126, 145 and 146. As illustrated in FIG. 2, a first rotor blade 125 is controlled by a first servo 129, a second rotor blade 126 is controlled by a second servo 130, a third rotor blade 145 is controlled by a third servo 133 and a fourth rotor blade 146 is controlled by a fourth servo 134. In one embodiment, the rear of the fuselage 110 is defined as a zero degree position, and the angular positions increase in a counter-clockwise direction, looking down at system 100 from above. In other words, if the first rotor blade 125 is defined as a reference blade, then when the first rotor blade 125 is directed to the rear of the fuselage 110, the azimuthal position of the first rotor blade 125 is zero (0) degrees; when the first rotor blade 125 is at an angle ninety (90) degrees counter-clockwise from the rear of the fuselage 110, the azimuthal position of the first rotor blade 125 is ninety (90) degrees, etc.

Figure 3A:
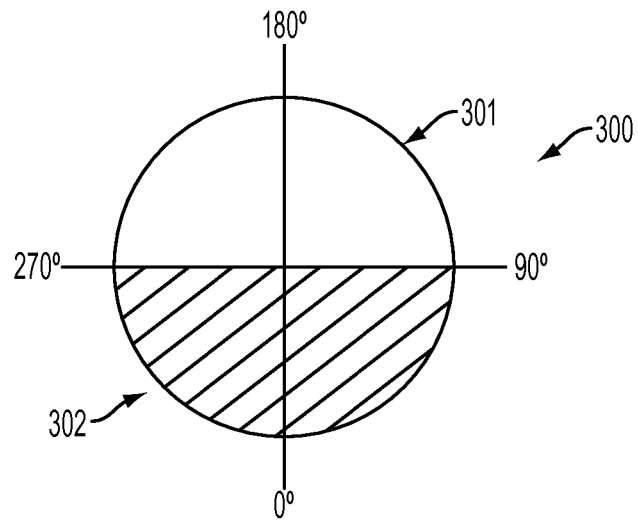
FIG. 3A illustrates the division of a rotor rotation area into zones according to one embodiment of the invention.
Figure 3B:
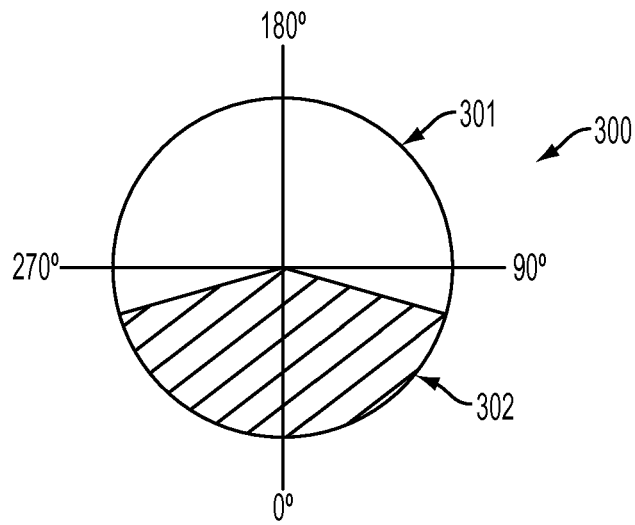
FIG. 3B illustrates the division of a rotor rotation area into zones according to another embodiment of the invention.

In embodiments of the invention, the rotation area of the first and second rotors 121a and 121b is divided into multiple zones, and different rotor-blade control signals are generated to control the rotor blades in each zone. FIGS. 3A and 3B illustrate examples of dividing the rotation area of a rotor into zones according to an embodiment of the invention.

Referring to FIG. 3A, a rotation area 300 of a rotor, such as the first or second rotor 121a or 121b is three hundred and sixty (360) degrees. In one embodiment, illustrated in FIG. 3A, a first zone 301 is defined as the forward portion of the rotation area 300, or the portion 301 between the angles of two hundred and seventy (270) degrees and ninety (90) degrees, passing through one hundred and eighty (180) degrees. The second zone 302 is defined as the aft portion of the rotation area 300, or the portion 302 between the angles of two hundred and seventy (270) degrees and ninety (90) degrees, passing through zero (0) degrees.

Referring to FIG. 3B, the first and second zones 301 and 302 are not limited to the regions in FIG. 3A, but may correspond to any desired regions. For example, FIG. 3B illustrates the first zone 301 as extending between the angles of two hundred and ninety (290) degrees and seventy (70) degrees, passing through one hundred and eighty (180) degrees. The second zone 302 is defined as the aft portion of the rotation area 300, or the portion 302 between the angles of two hundred and ninety (290) degrees and seventy (70) degrees, passing through zero (0) degrees.

While FIGS. 3A and 3B illustrate only two examples of dividing a rotation area of a rotor into different rotor-command zones, embodiments of the invention are not limited to the illustrated examples. However, in embodiments of the invention, the first region includes the one hundred eighty (180) degree rotation angle and the second region 302 includes the zero (0) degree rotation angle.

In embodiments of the invention, each of the first rotor 121a and the second rotor 121b may be divided into zones corresponding to an up-flow portion and a down-flow portion. The zones of each of the rotors may have the same angular region or may include different angular regions. The rotor blades of the rotors 121a and 121b may have opposing pitch angle changess in each region. For example, if the first rotor blade 121a is divided into a forward region and an aft region, and if the second rotor 121b is divided into a forward region and an aft region, the rotor blades in the forward region of the first rotor 121a may have a pitch angle change that is opposite a pitch angle change of the rotor blades in the forward region of the second rotor 121b (e.g. five (5) degrees and negative five (−5) degrees). Similarly, the rotor blades in the aft region of the first rotor 121a may have a pitch angle change that is opposite a pitch angle change of the rotor blades in the aft region of the second rotor 121b.

Figure 4:
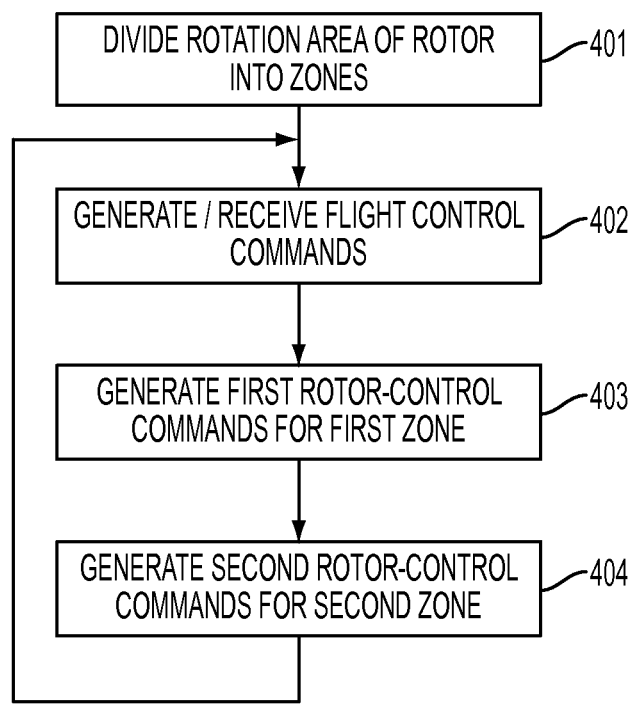
FIG. 4 is a block diagram of a method for controlling rotor blades according to an embodiment of the invention.

FIG. 4 is a block diagram of a method of controlling rotor blades according to an embodiment of the invention. One implementation of the invention is described with respect to FIGS. 1, 2, 3 and 4.

In block 401, the rotation area of the rotors 121a and 121b is divided into multiple zones, such as zones 301 and 302 of FIGS. 3A and 3B. The different zones correspond to regions which receive different rotor blade control commands. In one embodiment, the zones correspond to different air-flow directions. For example, air may flow through the region 301 in a direction from below the rotors 121a and 121b (i.e. up-flow), and air may flow through the region 302 from in a direction from above the rotors 121a and 121b (i.e., down-flow). Typically in the region 301 where the airflow is coming from below the rotors 121a and 121b, the airflow will increase as aircraft airspeed and descent rate are increased.

In one embodiment, a range of rotation angles is identified corresponding regions of the rotors that are subjected to, or are likely to be subjected to, an up-flow of air to the rotors. For purposes of description, the range of rotation angles corresponding to the predominantly up-flow of air is described as being a first zone, such as the first zone 301 of FIGS. 3A and 3B. In particular, referring to FIG. 2, it may be determined that the rotor 121b is subjected to an air flow that is predominantly an up-flow of air in one angular region (first zone 301). Likewise, it may be determined that the rotor 121b is subjected to an air flow that is predominantly a down flow of air in another angular region (second zone 302).

Subjecting the rotor 121b to predominantly an up-flow of air may cause the rotor-based system 100 to decrease the torque of the rotor when the blade angle is increased. This may cause a yawing moment in the system 100 in the opposite direction from the direction that is conventionally expected by an increase of the rotor blade angle and may cause the system 100 to turn incorrectly, or perform an incorrect yaw adjustment. Therefore, identifying the portion of the rotor 121b that is subjected to the up-flow allows for improved yaw control by not applying any rotor blade angle yaw command in this region. In some cases even a blade angle in reverse direction can be applied for yaw control improvement. In one embodiment, the first zone, or the range of rotation angles that is determined to be subjected to the up-flow of air through the rotor, is the forward portion of the rotor-based system 100, or the portion between the angles of two hundred and seventy (270) degrees and ninety (90) degrees, passing through one hundred and eighty (180) degrees. In one embodiment, this range of angles is determined based on testing or other empirical analysis prior to flight of the rotor-based system 100. In another embodiment, sensors of the rotor-based system 100 may be used to determine the portions of the rotor 121b subjected to the up-flow during operation of the rotor-based system 100, or while the rotor-based system 100 is in flight.

In one embodiment, the entire portion of the rotor 121b between, and including, two hundred and seventy (270) degrees and ninety (90) degrees, passing through one hundred and eighty (180) degrees, is treated as a predetermined range of rotation angles that is subjected to special control. In an alternative embodiment, a sub-set of angles within the range of two hundred and seventy (270) degrees and ninety (90) degrees, passing through one hundred and eighty (180) degrees, is determined to be subjected to up-flow. For example, it may be determined that the portion of the rotor 121b between two hundred and fifty-five (255) degrees and one hundred and five (105) degrees, and including one hundred eighty (180) degrees, is subjected to the up-flow. In another example, it may be determined that a portion of the rotor 121b between two hundred and forty (240) degrees and one hundred and twenty (120) degrees, and including one hundred eighty (180) degrees, is subjected to the up-flow of air.

In yet another embodiment, the range of angles in which it is determined that the rotor 121b is subjected to an up-flow of air may be greater than one-hundred eighty (180) degrees. For example, it may be determined that the portion of the rotor 121b between two hundred and eighty-five (285) degrees and seventy-five (75) degrees, and including one hundred eighty (180) degrees, is subjected to the up-flow. In another example, it may be determined that a portion of the rotor 121b between three-hundred (300) degrees and sixty (60) degrees, and including one hundred eighty (180) degrees, is subjected to the up-flow.

The portion of the rotation area that is not included in the first zone constitutes a second zone, such as the second zone 302 of FIG. 3. In the embodiment in which the first zone corresponds to a range of rotation angles in which the rotors 121a and 121b are subjected to predominantly an up-flow of air (air coming to the rotor from below), the second zone corresponds to a range of rotation angles in which the rotors 121a and 121b are subjected to predominantly down-flow of air (air coming to the rotor from above).

While one example of a basis for dividing the rotation area of the rotors 121a and 121b into multiple zones has been provided (i.e. a zone that is subjected to an up-flow of air and a zone that is subjected to a down-flow of air), embodiments of the invention encompass dividing the rotation area of the rotors 121a and 121b into zones for providing different rotor control commands for any reason.

In block 402, flight control commands are received by a rotor-control computer, such as the rotor-control computers 131 and 132 of FIG. 1. In one embodiment, the flight control commands are generated based on pilot manipulation of physical controls, and in another embodiment, the flight control commands are generated based on a remote control or based on execution of a flight program by an auto-pilot. The flight control commands may include yaw commands to position the rotor-based system 100 to have a particular yaw. The yaw commands may include a target yaw value. For example, the target yaw value may correspond to a yaw rotation of five (5) degrees to the right from a present heading of the fuselage 110. Over time, as the pilot or flight-control computer desires to turn the rotor-based system 100 in different directions, different target yaw values are generated by the pilot of flight-control computer and received by the rotor-control computer.

In block 403, a set of first rotor control commands is generated to control the yawing moment of system 100. The yawing moment is controlled by controlling the rotor blade angles for individual rotor blades of a rotor assembly. In particular, the rotor blade angle changes are controlled to be different in a first zone, corresponding to a first angular region in which a flow of air to the rotor blades is predominantly an up-flow of air and a second zone corresponding to a second angular region complementary to the first angular region in which a flow of air to the rotor blades is predominantly a down-flow of air. In one embodiment, in the first region, in which the flow of air to the rotor blades is predominantly an up-flow of air, the rotor blade angle change is controlled to be zero (0). In another embodiment, the rotor blade angle change is controlled to be closer to zero (0) than in the second region. In yet another embodiment, the rotor blade angle change is controlled to be negative with respect to the rotor blade angle in the second zone.

In block 404, the rotor blade angle changes of the rotor blades in the second region are controlled to be different than in the first region. In one embodiment, in the second region, in which the flow of air to the rotor blades is predominantly a down-flow of air, the rotor blade angle change is controlled according to the yawing moment command to position the aircraft in the manner indicated by the yawing moment command. For example, if the yawing moment command provided by a pilot or flight control computer indicates that the aircraft should turn, the rotor blades in the first zone are adjusted by an angle around zero, and the rotor blades in the second zone are adjusted by an angle that corresponds to the turn indicated by the yawing moment command.

For example, an initial pitch angle of all of the rotor blades of a first rotor in a co-axial rotor assembly may be five (5) degrees to corresponds to a desired level of lift of the aircraft. In one embodiment, a range of rotation angles is determined that corresponds to an up-flow of air to the rotor blades, and the range is described herein as a first zone. The range of rotation angles outside the first zone is described as a second zone. The range of rotation angles corresponding to the up-flow of air may be based on measurements taken during the current flight of the aircraft, or may be predetermined angles provided to a control system prior to the flight of the aircraft, such as through flight testing or observation of other aircraft.

A yaw command is received by a rotor blade controller to adjust the yaw of the aircraft. The rotor blade controller may determine that adjusting the pitch of the rotor blades by six (6) degrees would turn the aircraft to the correct yaw moment. In such an example, the rotor blades in the first zone, corresponding to the region in which an up-flow is provided to the rotor blades, may be controlled to remain unchanged (i.e. at a pitch of five (5) degrees to maintain the lift of the aircraft). In contrast, the rotor blades in the second zone, corresponding to a region in which a down-flow of air is provided to the rotor blades, may be adjusted by six (6) additional degrees (or a total of eleven (11) degrees) to adjust the yaw moment of the aircraft according to the yaw command.

In addition, the rotor blades of a second co-axial and counter-rotating rotor may be controlled such that the rotor blades of the co-axial rotor in the first zone remain unchanged in response to the yaw command, and the rotor blades in the second zone are adjusted at a magnitude opposite the rotor blades of the first rotor (i.e. adjusted by minus six (−6) degrees) in response to the yaw command.

In addition the rotor blade angle change command in the first zone may remain near zero degrees, such as within +/−3 degrees. In addition rotor blade angle change command in first zone between first and second rotor may have opposite signs.

The above example is provided as a non-limiting example to explain one possible implementation of an embodiment of the invention. However, embodiments of the invention encompass rotor blades in the first zone being adjusted in a same direction, but at a lesser magnitude, than rotor blades in the second zone; rotor blades in the first zone being adjusted in an opposite direction than in the first zone; and rotor blades in the first zone being maintained at a constant pitch in response to any yaw command.

Embodiments of the invention further encompass controlling rotor blades in a first co-axial rotor and a second co-axial rotor in different manners. In one embodiment of the invention the change in rotor blade angle command in the second zone of the first and second rotors may have different magnitudes in absolute value, in addition to having opposite signs between the first rotor and second rotor. In one embodiment of the invention the change in rotor blade angle command in first zone of either or both first and second rotors may be other than zero.

In one embodiment of the invention the change in rotor blade angle command of one or both of the first and second rotors located within the same zone may be opposite in sign and may have the same magnitude (but with an opposite sign) or a different absolute magnitude.

In other words, in some embodiments of the invention, the rotor blades in the first zone are controlled to remain at a constant pitch regardless of the received yaw command. In contrast, the rotor blades angles are changed in the second zone and are opposite in sign between first and second rotor, and are controlled to change according to the different yaw commands to turn the rotor-based system 100.

In one embodiment, as illustrated in FIG. 1, the rotor assembly 120 includes multiple co-axial rotors 121a and 121b, where a second rotor 121b rotates in a direction opposite the first rotor 121a. In such an embodiment, block 401 of FIG. 4 includes dividing each of the rotation areas of the rotors 121a and 121b into zones. In one embodiment, the zones are the same for each rotor 121a and 121b. For example, each of the first and second rotors 121a and 121b may have a rotation area with a first zone that extends between two hundred and seventy (270) degrees and ninety (90) degrees, passing through zero (0) degrees of each of the first and second rotors 121a and 121b.

In block 403, the first rotor-control commands may include rotor-control commands for the rotor blades of the first rotor 121a in the first zone and rotor blades of the second rotor 121b in the first zone. In one embodiment, the rotor-control commands for each of the first and second rotors 121a and 121b in the first zone is the same. For example, the rotor blades in the first zone of the rotation areas of the first and second rotors 121a and 121b may all be controlled to have a change in the rotor pitch angle of around zero (0) degrees, regardless of the flight control commands received in block 402.

In block 404, the second rotor-control commands may be different for the second rotor 121b than for the first rotor 121a. In one embodiment, the second rotor-control commands for the rotor blades in the second zone of the rotation area of the second rotor 121b correspond to a pitch angle that is opposite the pitch angle of the rotor blades in the second zone of the rotation area of the first rotor 121a. For example, if the pitch angle of the rotor blades in the second zone of the first rotor 121a is five (5) degrees, then the pitch angle of the rotor blades in the second zone of the second rotor 121b may be negative five (−5) degrees.

In embodiments of the invention, each rotor blade of the first and second rotors 121a and 121b is individually controlled, such that each rotor blade within a predetermined range of rotation angles is arranged at a first pitch angle and each rotor blade outside the predetermined range of rotation angles is arranged at a second pitch angle. The first pitch angle may stay substantially the same for every received yaw command, and the second pitch angle may change to correspond to every received yaw command to control the yaw of the aircraft.

While embodiments of the invention have been described with respect to first and second zones within a rotation area of the rotors 121a and 121b, it is understood that in operation rotor blades cannot physically instantaneously switch from one rotation angle to another. Accordingly, the first zone and the second zone may correspond to areas in which particular commands are given to the rotor blades, so that when a rotor blade rotates from the first zone to the second zone, the commands supplied to the rotor blade change. Alternatively, the first zone may correspond to an area in which the rotor blades should have a particular pitch angle. In such an embodiment, the command to change the pitch angle of the rotor blades from a pitch angle corresponding to the second zone to a pitch angle corresponding to the first zone should be provided to the rotor blade prior to leaving the second zone and entering the first zone. In other words, it is understood that transition regions exist in border regions of the first and second zones in which the rotor blades transition from pitch angles corresponding to one zone to pitch angles corresponding to the other zone.

In embodiments of the present invention, yawing moment control in a co-axial counter rotating helicopter is provided by differentially changing individual blade angle in the aft portion of the rotor disc only, where there is down-flow air coming to the rotor from above. Therefore such a rotor blade angle change will provide consistent yawing moment throughout the selected flight envelope. Differential blade angle refers to changing blade angle of first rotor in one direction and changing the rotor blade angle of second rotor in opposite direction to produce yawing moment in one direction.

According to one aspect of the invention, a method for providing consistent yawing moment for co-axial counter rotating helicopter throughout the selected flight condition includes identifying a first rotor blade pitch control azimuth range where a rotor is receiving a down-flow of air from above the rotor. This will be determined based on the flight conditions where yaw control is to be provided. Flight conditions include such parameters as airspeed, descent rate, weight, altitude, atmospheric conditions etc. In addition, the method may include identifying a second rotor pitch control azimuth range.

According to another aspect of the invention, the helicopter yawing moment is generated by changing pitch angle of individual blades of a first rotor in a previously identified first rotor pitch control azimuth range. Similarly, the blade pitch angle in a second rotor is changed in an opposite direction from the previously-identified rotor pitch control azimuth range. To produce the yawing moment in opposite directions, the rotor blade angle is changed in an opposite direction on both rotors. Since the rotor blades are controlled to always provide air flow coming from the top, a consistent yawing moment is provided throughout the selected flight condition.

In one embodiment of the invention, the rotor control azimuth is determined for each application as needed. However the predetermined rotor pitch control azimuth lies within an azimuth range of rotor rotation angles that is within the range of two-hundred seventy (270) degrees and ninety (90) degrees, and passes through zero (0) degrees, where zero (0) degrees is defined by the location where the rotor blade is over the aft end of a fuselage of the aircraft. But in some cases the preferred rotor pitch control azimuth range will be much larger. Predetermined rotor pitch control azimuth range is provided as starting point guidance only.

In one embodiment of the invention the blade angle command within first or second zone may be constant at all rotor rotation angles within that zone except transition zone between first and second zone boundary.

In one embodiment of the invention the rotor blade angle change within first or second zone may vary with blade rotation angle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling rotor blades of a co-axial counter-rotating rotor assembly of an aircraft including a first rotor co-axial with a second rotor, comprising:

identifying a first zone of rotor rotation angles of the co-axial counter-rotating rotor assembly, the first zone defining a range of rotor rotation angles corresponding to an up-flow of air to the coaxial rotor assembly, and the remainder of the rotor rotation angles other than the first zone of rotation angles being defined as a second zone;

receiving a yaw command to adjust a yaw moment of the aircraft; and applying a different rotor blade angle change to rotor blades in the first zone than a rotor blade angle change applied to rotor blades in the second zone to adjust the yaw moment of the aircraft according to the yaw command.

2. The method of claim 1, wherein the change in rotor blade angle applied to rotor blades in the second zone of the first rotor is opposite the change in rotor blade angle applied to rotor blades in the second zone of the second rotor.

3. The method of claim 1, wherein the range of angles corresponding to the first zone corresponds to an up-flow of air to the first rotor, the method further comprising:

identifying a third zone of rotation angles of the second rotor, the third zone defining a range of rotor rotation angles corresponding to an up-flow of air to the second rotor, and the third zone having a size different from the first zone, and the remainder of the rotor rotation angles of the second rotor other than the third zone of rotation angles being defined as a fourth zone;

applying a different rotor blade angle change to rotor blades in the third zone than a rotor blade angle change applied to rotor blades in the fourth zone to adjust the yaw moment of the aircraft according to the yaw command.

4. The method of claim 1, further comprising:

individually and separately controlling the blade pitch angle of each rotor blade of the co-axial rotor assembly.

5. The method of claim 1, further comprising:

adjusting the rotor blade angle of each rotor blade within the first zone and the second zone according to an azimuthal position of the each rotor blade within the first zone and the second zone, respectively.

6. The method of claim 1, wherein the first zone includes a range of rotation angles within a range between, and including, ninety (90) degrees and two-hundred seventy (270) degrees, and passing through one-hundred eighty (180) degrees, where one hundred eighty (180) degrees is defined by a front end of a fuselage of the aircraft.

7. The method of claim 1, wherein the change in rotor blade angle of the rotor blades in the first zone is around zero (0) degrees.

8. The method of claim 1, wherein the first zone includes a range of rotation angles within a range between, and including, ninety (90) degrees and two-hundred seventy (270) degrees, and passing through one-hundred eighty (180) degrees, where one hundred eighty (180) degrees is defined by a front end of a fuselage of the aircraft, and the change in rotor blade angle of the rotor blades in the first zone is around zero (0) degrees.

9. A method for controlling rotor blades of a co-axial rotor assembly of an aircraft, comprising:

receiving a target yaw value to adjust a yaw moment of the aircraft;

controlling a change in pitch angle of the rotor blades of the co-axial rotor assembly within a predetermined range of rotation angles defining a first zone to have a substantially constant value based on receiving the target yaw value; and controlling a change in pitch angle of the rotor blades of the co-axial rotor assembly in the remainder of rotation angles other than the predetermined range of rotation angles, defining a second zone, to be adjusted based on receiving the target yaw value.

10. The method of claim 9, wherein the predetermined range of rotation angles defining the first zone corresponds to a flow of air onto the rotor blades of the rotor assembly that is an up-flow of air, and the rotation angles of the second zone correspond to a flow of air onto the rotor blades of the rotor assembly that is a down-flow of air onto the rotor blades.

11. The method of claim 9, wherein the predetermined range of rotation angles is within the range of two-hundred seventy (270) degrees and ninety (90) degrees, and passing through one hundred eighty (180) degrees, where one hundred eighty (180) degrees is defined by a front end of a fuselage of the aircraft.

12. The method of claim 9, wherein the substantially constant value is around zero (0).

13. The method of claim 9, wherein the co-axial rotor assembly includes a first rotor and a second rotor co-axial with the first rotor, and controlling a change in pitch angle of the rotor blades of the co-axial rotor assembly in the second zone includes changing a pitch angle of the rotor blades of the first rotor in a first rotation direction, and changing a pitch angle of the rotor blades of the second rotor in an opposite rotation direction to the first rotation direction.

14. A co-axial rotor assembly of an aircraft, comprising:

a first rotor including a plurality of rotor blades to rotate around a shaft;

a second rotor being co-axial with the first rotor and rotating in a direction opposite the first rotor; and a rotor-blade controller to identify a first zone of rotor rotation angles of the co-axial rotor assembly, the first zone defining a range of rotor rotation angles corresponding to an up-flow of air to the coaxial rotor assembly, and the remainder of the rotor rotation angles other than the first zone of rotation angles being defined as a second zone, the rotor-blade controller to receive a yaw command to adjust a yaw moment of the aircraft, and the rotor-blade controller to apply a different rotor blade angle change to rotor blades in the first zone than a rotor blade angle change applied to rotor blades in the second zone to adjust the yaw moment of the aircraft according to the yaw command.

15. The co-axial rotor assembly of claim 14, wherein the change in rotor blade angle applied to rotor blades in the second zone of the first rotor is opposite the change in rotor blade angle applied to rotor blades in the second zone of the second rotor.

16. The co-axial rotor assembly of claim 14, wherein the range of angles corresponding to the first zone corresponds to an up-flow of air to the first rotor, the rotor-blade controller is to identify a third zone of rotation angles of the second rotor, the third zone defining a range of rotor rotation angles corresponding to an up-flow of air to the second rotor, the third zone having a size different from the first zone, and the remainder of the rotor rotation angles of the second rotor other than the third zone of rotation angles being defined as a fourth zone, and the rotor-blade controller is to apply a different rotor blade angle change to rotor blades in the third zone than a rotor blade angle change applied to rotor blades in the fourth zone to adjust the yaw moment of the aircraft according to the yaw command.

17. The co-axial rotor assembly of claim 14, wherein the rotor-blade controller is to individually and separately control the blade pitch angle of each rotor blade of the co-axial rotor assembly.

18. The co-axial rotor assembly of claim 14, wherein the first zone includes a range of rotation angles within a range between, and including, ninety (90) degrees and two-hundred seventy (270) degrees, and passing through one-hundred eighty (180) degrees, where one hundred eighty (180) degrees is defined by a front end of a fuselage of the aircraft.

19. The co-axial rotor assembly of claim 14, wherein the change in rotor blade angle of the rotor blades in the first zone is around zero (0) degrees.

20. The co-axial rotor assembly of claim 14, wherein the first zone includes a range of rotation angles within a range between, and including, ninety (90) degrees and two-hundred seventy (270) degrees, and passing through one-hundred eighty (180) degrees, where one hundred eighty (180) degrees is defined by a front end of a fuselage of the aircraft, and the change in rotor blade angle of the rotor blades in the first zone is around zero (0) degrees.

\* \* \* \* \*